United States Patent [19]  [11] Patent Number: 4,640,329
Nakasaki et al.  [45] Date of Patent: Feb. 3, 1987

[54] RADIAL TIRE FOR MOTORCYCLES

[75] Inventors: Eiji Nakasaki, Kakogawa; Hisashi Shirashoji; Katsuyuki Hoshikawa, both of Kobe; Takao Kamijo, Toyonaka; Kazushige Ikeda, Akashi; Yasuhiro Inoue, Himeji; Takeo Kato, Nishinomiya, all of Japan

[73] Assignee: Sumitomo Rubber Industries, Ltd., Kobe, Japan

[21] Appl. No.: 640,270

[22] Filed: Aug. 13, 1984

[30] Foreign Application Priority Data

Aug. 11, 1983 [JP] Japan .................... 58-147458

[51] Int. Cl.$^4$ ............... B60C 11/06; B60C 9/20
[52] U.S. Cl. ................... 152/209 R; 152/526; 152/527; 152/541; 152/550; 152/554
[58] Field of Search ............ 152/209, 526, 527, 541, 152/550, 554

[56] References Cited

U.S. PATENT DOCUMENTS 4,289,182 9/1981 Sato et al. ............. 152/209 R
4,589,461 5/1986 Ohkuni et al. ......... 152/209 R

FOREIGN PATENT DOCUMENTS 56-90703 7/1981 Japan ................ 152/209 R
58-22704 2/1983 Japan.
1222759 2/1971 United Kingdom ........ 152/356
2102746 2/1983 United Kingdom.

Primary Examiner—Lois E. Boland
Attorney, Agent, or Firm—Armstrong, Nikaido, Marmelstein & Kubovcik

[57] ABSTRACT

Radial tires for motorcycles comprising a tread portion, side wall portions, bead portions, a carcass, a breaker, and optionally a reinforcing cord layer arranged outside the carcass and extending from one bead portion to the other bead portion and bead apexes made of a hard rubber, said tread portion having a plurality of longitudinal grooves in the circumferential direction at an angle of at least 5° with respect to the cords of the most outer ply of the breaker. The motorcycle radial tires of the invention have an improved transverse stiffness at the side wall portions and moreover do not cause cracks at the bottom of the grooves in the tread portion.

6 Claims, 2 Drawing Figures

FIG. 1
FIG. 2
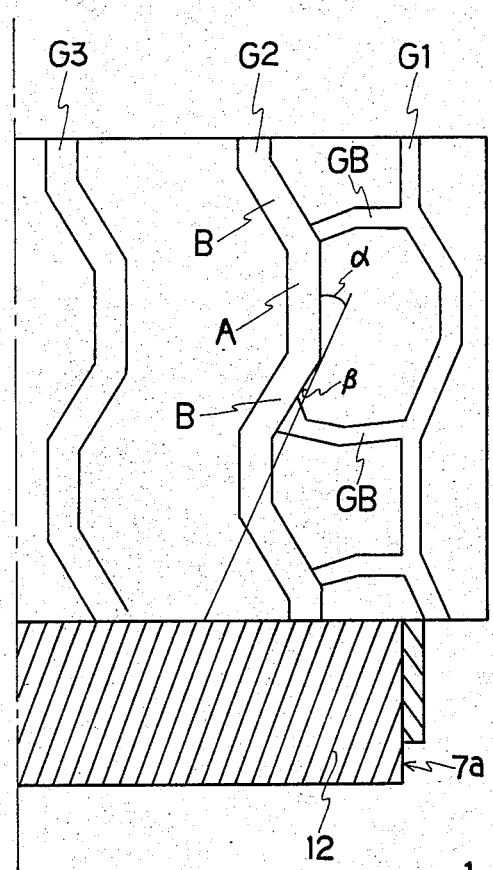
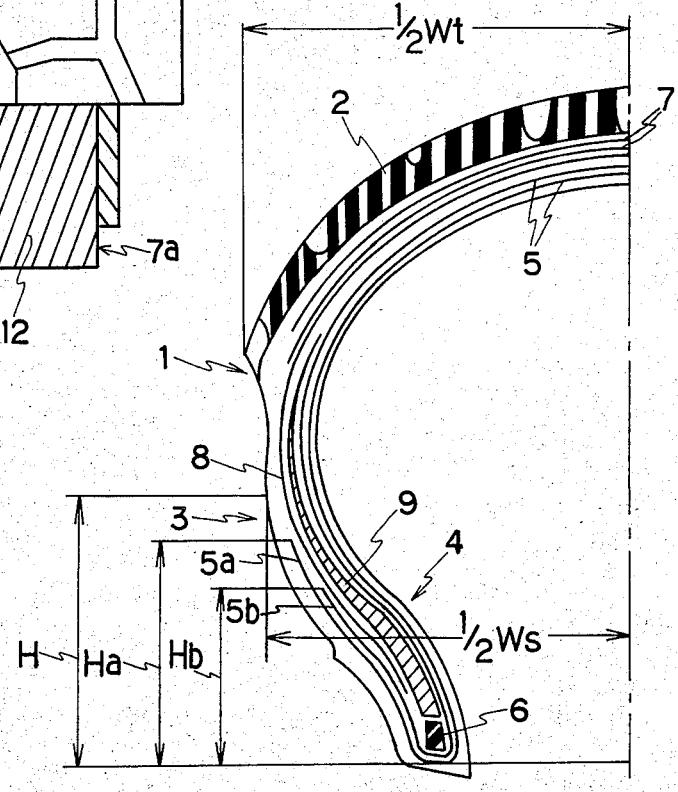

RADIAL TIRE FOR MOTORCYCLES

BACKGROUND OF THE INVENTION

The present invention relates to a tire for motorcycles, and more particularly to a radial tire for motorcycles which is improved in preventing cracks from developing at the bottoms of longitudinal grooves of the tire tread.

With recent prevalence of pavement, it has been intended to raise the speed of vehicles and, therefore, motorcycle tires are also required to possess characteristics capable of accommodating the high speed running.

Generally, for the carcass of motorcycle tire, widely employed is a cross-ply structure, that is, such a structure that ply cords of the carcass intersect each other at an angle of about 30° to 60° with respect to the circumferential direction of the tire. The reason is that the tire for motorcycle is basically different from that for four-wheel vehicles such as passenger car, particularly, in motional functions at the time of turning, and is required to have characteristics to maintain stable running while resisting centrifugal force acting upon the motorcycle body with a force (camber thrust) generated when the motorcycle is tilted during turning at a large angle to a plane perpendicular to the road surface (when a large degree of camber angle is given), which horizontally acts along the direction in which the camber angle is given. Therefore, the motorcycle tire is strengthened in transverse stiffness by employing a carcass of the cross-ply structure as described above so as to maintain the camber thrust. The radial structure inferior in transverse stiffness has been scarcely adopted for the motorcycle tires from the above-mentioned point of view. However, the tire of the cross-ply structure has the drawbacks that transverse vibration (weave phenomenon) of the motorcycle body resulting from cornering power and transverse stiffness of the tire occurs during high speed running and that the abrasion resistance is low. As countermeasures to such problems, the cord angle of carcass to the circumferential direction of the tire is lowered or the number of carcass plies is increased for increasing the tire stiffness, but the drawbacks attributable to the structure cannot completely be removed as far as the cross-ply structure is employed.

Although radial tires have the drawback of poor transverse stiffness, they are superior in steering stability in high speed running and abrasion resistance. It is known to dispose a breaker to reinforce the tires, whereby the tread stiffness is raised and the abrasion resistance and steering stability are improved. On the other hand, in case of the motorcycle tires, it causes a problem that the tread surface becomes susceptible to deformation stress in the radial direction because of a large curvature in the tread section and a small thickness of the tread and, consequently, cracking is easy to occur at the bottoms of the tread grooves. For the reasons as mentioned above, the radial structure has been scarcely applied to tires for motorcycles.

SUMMARY OF THE INVENTION

In accordance with the present invention, there is provided a tire for motorcycles comprising a tread portion, side wall portions extending inwardly from the both ends of said tread portion in the radial direction, bead portions positioned at the radially inward ends of the side walls, a toroidal carcass composed of cords which extend approximately parallel with each other in the radial direction of the tire and of which the both end portions are turned up around bead cores, and a breaker arranged on the radially outer side of said carcass so that the cords thereof are extended at an angle of 5° to 35° to the circumferential direction of the tire, said tread portion having in its surface a plurality of longitudinal grooves which extend in the circumferential direction of the tire and which are arranged at an angle of at least 5° with respect to the cord extending direction of the most outer ply of said breaker.

The radial tire for motorcycles of the invention has an excellent durability and a camber thrust improved to a level as high as that of the cross-ply tire, while the advantages of the radial structure such as abrasion resistance, grip characteristic and high speed running function can be exhibited.

BRIEF DESCRIPTION OF THE DRAWINGS

FIG. 1 is a partially cutaway partial plan view of the tire for motorcycles of the present invention; and FIG. 2 is a partial section view of the tire for motorcycles of the present invention.

DETAILED DESCRIPTION

An embodiment of the present invention will be described with reference to the accompanying drawings.

FIG. 1 is a partially cutaway plan view showing a right half of the tread portion of the motorcycle tire according to the present invention. The left half may be imaginarily drawn to be symmetrical with the right half. The tread are provided with a plurality of longitudinal grooves, and optionally with a plurality of transverse grooves. In the drawing, longitudinal grooves G1, G2 and G3 extending in the circumferential direction of the tire are provided in the surface of the tread of the tire. Each of the grooves G1, G2 and G3 includes first elements A extending parallel with the circumferential direction of the tire and second elements B extending bias with respect to the circumferential direction of the tire. In the present invention, the longitudinal groove may be composed of only the first element A, or of three or more elements, namely at least three elements of the first element A, the second element B inclined in one direction and the second element B inclined in the reverse direction. Transverse grooves GB for connecting the longitudinal grooves with each other may be optionally provided.

Referring to FIG. 2, tire 1 comprises a tread portion 2, side wall portions 3 extending inwardly from the both ends of the tread 2 in the radial direction of the tire, and bead portions 4 positioned at the radially inward ends of the side walls 3. The tread 2 extends over the crown of carcass 5 from the center to the both ends and approximately parallelly with the arcuate configuration of the crown. The width Wt of the tread usually exceeds the maximum width Ws between the both side walls, whereby camber thrust generated when the tire is tilted can be maintained.

Breaker 7 is provided on the crown of the carcass 5 over almost the full width of the tread portion 2, thereby increasing hooping effect of the tread. Cords of the breaker are arranged at an angle of 5° to 35°, preferably 10° to 25°, with respect to the circumferential direction of the tire. When the angle of the cord arrangement is too small, the tread stiffness is increased, whereby impact caused by small pebbles scattered on the road or by ruggedness of the road is felt stronger by the driver and the running stability as well as feeling of riding of the motorcycle is impaired. On the other hand, a too large angle impedes the steering stability at the time of high speed running. Usually, the breaker 7 is composed of two plies. The width of at least one of them is adapted to be substantially equal to the width Wt of the tread. Textile materials used for the cords of the breaker may be the same as those used for a reinforcing layer mentioned after. In particular, it is preferable that aromatic polyamide cords having a tensile strength of not less than 7 g/d and an initial modulus of not less than 200 g/d are used and embedded into a rubber having a modulus at 300% elongation of 120 to 240 kg/cm² in parallel with each other. Also, bands may be provided at the both ends of the breaker for preventing the ply separation.

Since the radial tire is reinforced, as mentioned above, by arranging cords having a high modulus of elasticity at a relatively low angle to the circumferential direction of the tire, the tread surface becomes susceptible to deformation stress in the radial direction, whereas the tread stiffness is raised to improve the abrasion resistance and the steering stability. That is to say, in case of the motorcycle tires, the curvature in the tread section is large and the tread is thin and, therefore, the tread surface is susceptible to deformation. Particularly, in the case where longitudinal grooves are formed in the tread surface at an angle coincident with that of the cord arrangement of the breaker, the groove bottoms are deformed in such a manner that the grooves are periodically widened to cause cracks at the bottoms.

The present inventors have eliminated the occurrence of cracking by arranging the longitudinal grooves of the tread and the breaker so that the bias angle of the longitudinal grooves do not coincide with the angle of the cord arrangement of the breaker. This is one of the features of the present invention. As shown in FIG. 1, cords 12 of the outermost breaker ply 7a intersect the longitudinal groove at degrees of angle $\alpha$ and $\beta$ at the first element A and at the second element B, respectively. It is necessary that the both angles $\alpha$ and $\beta$ are at least 5°. When the intersecting angle is less than 5°, cracks are caused at the bottoms of the grooves.

Carcass 5 of the tire shown in FIG. 2 is composed of two plies, and each of the both ends thereof is turned up around a bead core 6 outwardly from the inside of the bead core 6 and terminates at the bead portion 4 or the side wall portion 3. It is desirable that the turned-up end portion 5a located outside in the bead portion is extended to a higher position than that of the turned-up end portion 5b located inside in the bead portion so as to completely cover the above inner turned-up end portion, thereby mitigating stress concentration at the inner turned-up end portion. Further, for reinforcing the side wall 3, heights Hb and Ha between the bead base and each of the inner turned-up end 5b and the outer turned-up end 5a are preferably determined to be within the ranges of from 55 to 65% and from 70 to 100% of the height H between the bead base and a position where the width of the side wall is the largest, respectively.

Cords in the above-mentioned carcass are arranged in parallel or approximately parallel with the radial direction of the tire. The expression "approximately parallel" as used herein means that the cords are arranged at an angle of not more than 10° with respect to the radial direction of the tire. When the cords are arranged at angles of more than 10°, excellent characteristics of the radial tire to be exhibited during high speed running cannot be obtained. Textile materials used for the cords of the carcass in the present invention are those usually used, e.g. organic fibers such as Nylon, polyester, rayon and aromatic polyamide fibers.

In this invention, one or more plies are used for the carcass. In addition to a structure in which the carcass is turned-up at its both ends outwardly from the inside around the bead cores 6 as shown in the drawing, another structure in which the both end portions of the carcass are turned-up from the outside to the inside around the bead cores or further one in which the former two are combined, may be employed. The structure shown in the drawing is preferable.

In the present invention, a reinforcing layer 8 composed of fiber cords and extending from the bead portion on one side to the other bead portion on the other side may be provided on the radially outer side of the carcass 5 and below the breaker 7, the both ends of which terminate without being turned-up around the bead core 6. The cords of the reinforcing layer intersect the carcass cords at a certain fixed angle to reinforce the side wall portion. For improving the cornering characteristic without impairing comfortableness during riding, it is necessary to increase transverse resiliency coefficient without increasing vertical resiliency coefficient and, therefore, it is necessary to arrange the cords of the reinforcing layer 8 at an angle of 45° to 85°, preferably from 60° to 80°, to the circumferential direction. Each of the both end portions of the reinforcing layer is preferably laid in layers with the above-mentioned turned-up end portions 5a and 5b of the carcass for reducing stress concentration in this zone. Materials usable for cords are organic fibers such as Nylon, polyester, rayon and aromatic polyamide fibers. Steel cords are also used as well as the cords of the above textile materials. In case of providing a bead apex 9 mentioned after, the reinforcing layer 8 may be disposed, as shown in the drawing, between the outer surface of the bead apex 9 and the turned-up end portions 5a and 5b, or disposed between the inner surface of the bead apex 9 and the carcass ply.

In the present invention, a bead apex 9 made of a hard rubber and extending from the bead core 6 toward the side wall while decreasing in thickness may be arranged between the carcass or the turned-up end portion thereof and the reinforcing layer, thereby further reinforcing the transverse stiffness of a portion between the bead and the side wall. The upper end of the bead apex 9 is preferably extended at least to the zone near a position where the width of the side wall is maximum. The hardness of the bead apex is from 65° to 95° in terms of JIS A hardness.

Since the radial structure is adopted in the carcass and the breaker is used, the tire for motorcycles of the present invention has the advantages that the durability in high speed running which is an inherent characteristic of the radial structure, namely critical speed for generation of standing wave, is increased and also the rolling resistance is decreased. Moreover, generation of cracks at the bottom of the tread groove is prevented by forming the longitudinal groove of the tread at an angle different from that of the cord arrangement of the breaker. Further, because of the arrangement of the breaker, the turned-up end portion of the carcass and the reinforcing layer in a particular structure, a low transverse stiffness which is a drawback peculiar to the radial tire is improved, thus the camber thrust is increased to enable a stable turning and also the so-called "wobbling phenomenon" is effectively prevented.

The present invention is more specifically described and explained by means of the following Examples.

EXAMPLES 1 AND 2 AND COMPARATIVE EXAMPLES 1 AND 2

Rear wheel tires of 120/90-18 in size having the structure shown in FIG. 2 were made (Examples 1 and 2 embodying the present invention). They were subjected to a drum test for observing generation of cracks at the bottom of the tread groove. For comparison, a conventional radial tire (Com. Ex. 1) and a conventional cross-ply tire (Com. Ex. 2) were also used in the test. Detailed specification of these tires are shown in Table 1.

The test for crack generation was carried out by running a tire on drums under the following tire durability testing conditions specified in JATMA motorcycle tire quality standard, and after the completion of the test step 3, further running the tire under the conditions of the test step 3 until cracks were generated.

The results are shown in Table 1.

Durability testing conditions
Air pressure: Air pressure corresponding to the maximum load (2.80 kg/cm²)
Load: Maximum load 290 kg × load percentage
Speed: 80 km/hour

| Test step | Load percentage (%) | Testing period (hour) |
|---|---|---|
| 1 | 100 | 4 |
| 2 | 110 | 6 |
| 3 | 115 | 24 |

TABLE 1

|  | Ex. 1 | Ex. 2 | Com. Ex. 1 | Com. Ex. 2 |
|---|---|---|---|---|
| (1) Carcass | | | | |
| Structure | Radial | Radial | Radial | Cross-ply |
| No. of plies | 2 | 2 | 2 | 4 |
| Angle of cord arrangement to circumferential direction | 88° | 88° | 88° | 34° |
| Textile material | Nylon | Nylon | Nylon | Nylon |
| Denier | 2/1260 d | 2/1260 d | 2/1260 d | 2/1260 d |
| (2) Breaker | | | | |
| No. of plies | 2 | 2 | 2 | — |
| Textile material | Aromatic polyamide | Aromatic polyamide | Aromatic polyamide | — |
| Denier | 2/1500 d | 2/1500 d | 2/1500 d | — |
| Angle of cord arrangement to circumferential direction | 22° | 15° | 22° | — |
| (3) Reinforcing layer | | | | |
| Textile material | Nylon | Nylon | Nylon | — |
| Denier | 2/1260 d | 2/1260 d | 2/1260 d | — |
| Angle of cord arrangement to circumferential direction | 75° | 75° | 75° | — |
| (4) Bead apex | | | | |
| Hardness (JIS A hardness) | 95° | 85° | 85° | — |
| Height of upper end from bead base | 48 mm | 48 mm | 48 mm | — |
| (5) Tread design | FIG. 1 | FIG. 1 | FIG. 1 | FIG. 1 |
| Angle of longitudinal groove to breaker cord: | | | | |
| β | 7° | 10° | 0° | 0° |
| α | 22° | 15° | 22° | 22° |
| Drum test Running distance till generation of cracks at tread groove bottom | 14000 km | 15000 km | 6500 km | 15000 km (no cracking) |

While the invention has been shown and described with reference to a preferred embodiment thereof, it is to be understood that various changes and modifications may be made in the invention without departing from the spirit and scope thereof.

What we claim is:

1. A tire for motorcycles comprising a tread portion, side wall portions extending inwardly from the both ends of said tread portion in the radial direction, bead portions positioned at the radially inward ends of said side wall portions, a toroidal carcass composed of cords which extend approximately parallel with each other in the radial direction of the tire and of which the both end portions are turned up around bead cores, and a breaker arranged on the radially outer side of said carcass so that the cords thereof are extended at an angle of 5° to 35° to the circumferential direction of the tire, said thread portion having in its surface a plurality of zigzagged-longitudinal grooves which extend in the circumferential direction of the tire and each elemental groove of said zigzagged-longitudinal grooves is arranged at an angle of at least 5° with respect to the cord extending direction of the most outer ply of said breaker.

2. The tire of claim 1, wherein said breaker is composed of aromatic polyamide fiber cords.

3. The tire of claim 1, wherein the cords of said breaker are arranged at an angle of 10° to 25° to the circumferntial direction of the tire.

4. The tire of claim 1, wherein said carcass is a 2 ply carcass and the both ends of each thereof are turned up outwardly from the inside around the bead cores so that the heights from the bead base of the turned-up end portion located inside and the turned-up end portion located outside are from 55 to 65% and 70 to 100% of the height between the bead base and a position at which the width of the side wall is maximum, respectively.

5. The tire of claim 1, wherein bead apexes made of a hard rubber and extending from positions just above the bead cores toward the side wall are further provided.

6. The tire of claim 1, wherein a reinforcing layer extending from the bead portion on one side to the other bead portion on the other side is further provided between the carcass and the breaker.

* * * * *